US010699488B1

(12) United States Patent
Terrano

(10) Patent No.: US 10,699,488 B1
(45) Date of Patent: Jun. 30, 2020

(54) SYSTEM AND METHOD FOR GENERATING REALISTIC AUGMENTED REALITY CONTENT

(71) Applicant: Facebook Technologies, LLC, Menlo Park, CA (US)

(72) Inventor: Mark Terrano, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/125,560

(22) Filed: Sep. 7, 2018

(51) Int. Cl.
*G06T 19/00* (2011.01)
*G06T 15/50* (2011.01)
*G06T 7/73* (2017.01)
*G06N 20/00* (2019.01)

(52) U.S. Cl.
CPC .......... *G06T 19/006* (2013.01); *G06N 20/00* (2019.01); *G06T 7/73* (2017.01); *G06T 15/506* (2013.01)

(58) Field of Classification Search
CPC ....... G06T 19/006; G06T 15/506; G06T 7/73; G06N 20/00; G06Q 30/0277
See application file for complete search history.

(56) References Cited

U.S. PATENT DOCUMENTS

| | | | | |
|---|---|---|---|---|
| 10,155,166 | B1 * | 12/2018 | Taylor | A63F 13/428 |
| 2012/0011454 | A1 * | 1/2012 | Droz | H04L 12/1827 |
| | | | | 715/758 |
| 2013/0335407 | A1 * | 12/2013 | Reitan | G06F 3/011 |
| | | | | 345/419 |
| 2015/0228122 | A1 * | 8/2015 | Sadasue | G06T 19/006 |
| | | | | 345/633 |
| 2016/0295280 | A1 * | 10/2016 | Zavesky | H04N 21/44218 |
| 2016/0379412 | A1 * | 12/2016 | Butler | G06T 19/006 |
| | | | | 345/633 |
| 2017/0186232 | A1 * | 6/2017 | Dange | G06F 3/011 |
| 2017/0200313 | A1 * | 7/2017 | Lee | G06T 19/006 |
| 2017/0372525 | A1 * | 12/2017 | Rosenthal | H04N 21/41407 |
| 2018/0251961 | A1 * | 9/2018 | France | E02F 3/435 |
| 2019/0251622 | A1 * | 8/2019 | Wiedmeyer | G06T 19/003 |

* cited by examiner

Primary Examiner — Diane M Wills
(74) Attorney, Agent, or Firm — Baker Botts L.L.P.

(57) ABSTRACT

In one embodiment, the system captures an image using a camera. The image is associated with a user viewpoint. The system identifies a surface in the image using a machine learning model. The surface has associated properties meeting one or more criteria for rendering a three-dimensional virtual space. The system determines relative positions and orientations of three-dimensional display elements to the surface. The system determines the three-dimensional virtual space based at least on the properties of the surface, the user viewpoint, and the relative positions and orientations of the three-dimensional display elements to the surface. The three-dimensional virtual space comprises the three-dimensional display elements, which are positioned behind the surface. The system renders the three-dimensional virtual space on the surface. The three-dimensional virtual space is visible through a display area on the surface as seen from the user viewpoint.

20 Claims, 9 Drawing Sheets

SYSTEM AND METHOD FOR GENERATING REALISTIC AUGMENTED REALITY CONTENT

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to a method of identifying a surface in the real-world environment and rendering display contents on the detected surface. For example, the system may detect a blank surface on a wall and render a 3D virtual space (e.g., a 3D virtual storefront, a 3D virtual display window) including one or more display elements (e.g., a 3D object, a product, a model, etc.) on the surface. In particular embodiments, the 3D virtual space may have one or more internal virtual light sources to make the storefront look real. In particular embodiments, the system may use machine perception (e.g., machine learning model) to detect the existing contents displayed in the real-world (e.g., billboards, walls, road surface, back of bench, bus, bag, package box) and may render the same contents at the same places of the virtual space or replace them with other display contents like arts, daily inspirations, or ads replacement.

In particular embodiments, when a user is looking at a rendered content, the system may, with the user's permission, track the user's movement to determine how the user is seeing the rendered content (e.g., location, time, duration, attention to an element, time since last impression, reactions, etc.). The system may track the user's behaviors or activities after the user has seen the rendered content. For example, the system may determine (e.g., using object recognition) that the user is holding a product shortly after seeing a rendered content related to that product. The system may determine correlations between the user impression of the rendered content and the user behaviors after the impression. For example, the system may determine how many impressions of a certain content would lead to the user to take certain actions. When a user looks at a rendered content, the system may allow the user to use a gesture or voice command to add information or actionable items related to that content to a note or list. For example, the user may add a product to a shopping list after seeing a rendered content about that product.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
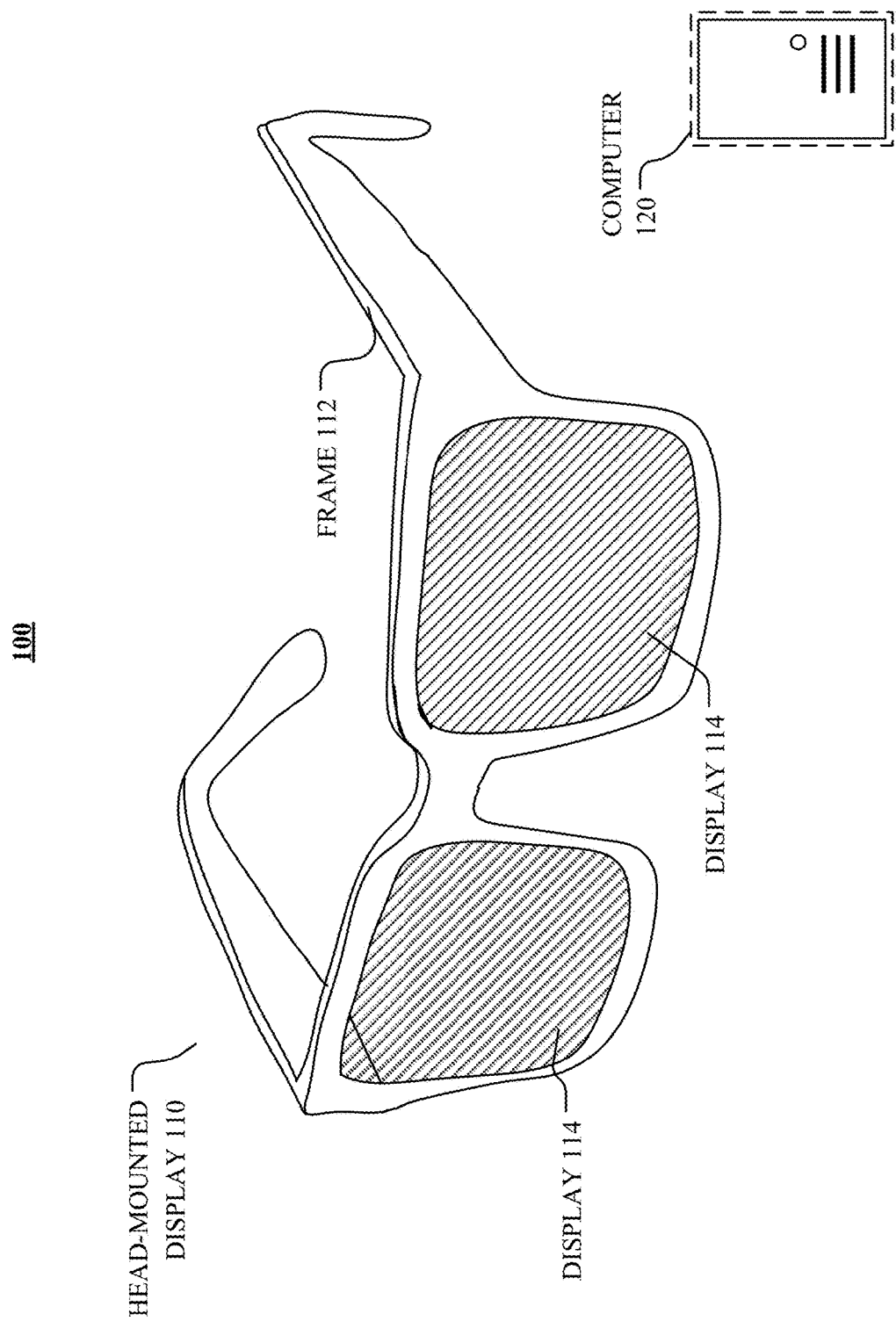
FIG. 1 illustrates an example augmented reality system.

FIG. 1 illustrates an example augmented reality system 100. In particular embodiments, the augmented reality system 100 may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100 may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users. In particular embodiments, the augmented reality system 110 may include a mobile device (e.g., a mobile phone, a tablet computer). The mobile device may have one or more cameras which can capture images or videos of a real-world scene. The mobile device may display the captured images or videos on a display screen in real-time or at a later time. The augmented reality system 100 may render artificial reality content on the same display screen displaying the captured images or videos.

Particular embodiments improve artificial reality systems (e.g., augmented reality, virtual reality, mixed reality, etc.) by identifying real-world regions that are suitable for displaying 3D or/and 2D virtual content (e.g., 3D virtual storefronts, digital contents related to particular products). Particular embodiments render the virtual content for the identified regions so that the rendered virtual content appears to be part of the real-world environment. Particular embodiments improve artificial reality systems by providing better visual effect and more relevant visual content to a user. For example, particular embodiments of the system may use one or more internal light sources to make the visual effect of a 3D virtual storefront more realistic to the user. As another example, particular embodiments of the system may provide customized visual effect (e.g., a 3D effect for a user viewpoint) to a user based on a number of factors associated with the user and the environment that the user is in. Particular embodiments further improve the artificial reality systems by providing more effective feedback to content providers by collecting real-time feedback data and aggregating following-on activity data from the user about the rendered visual effect.

In particular embodiments, the artificial reality system may capture one or more images using one or more cameras associated with an artificial reality headset worn by a user. The images may be captured in real-time from the user's viewpoint. The images may cover a particular area (e.g., a street, a shopping mall, a residential area, etc.). The system may use a machine learning (ML) model to process the images to identify surfaces suitable for rendering digital content. The ML model may be trained using a large number of training samples (e.g., 5 to 10 thousand images) to identify suitable surfaces for rendering digital content. The identified surface may be a blank surface or a surface having existing content. The identified surfaces may be, for example, but are not limited to, a billboard, a bus surface, a taxicab surface, a bus stop, a building, a bag surface, a wall, a road surface, a package box surface, etc.

In particular embodiments, the system may determine (e.g., using machine learning model, computer stereo vision technology, etc.) a 3D perception (e.g., a position, a size, a proportion, an orientation, an angle to a user viewpoint) of the identified surface with high accuracy and high precision. In particular embodiments, the system may further determine the user viewpoint information (e.g., a head position, a gazing direction, a view angle) with high accuracy and high precision. The 3D perception information and the viewpoint information may be used to determine the digital content to be rendered on the surface.

In particular embodiments, one or more augmented reality systems may collectively map the real-world places (e.g., worn by users moving around) and classify surfaces of these places with respect to degrees of importance to users seeing these places. The augmented reality systems may identify secondary spaces (e.g., blank walls, sections of floor, objects where additional content can be displayed) which may have low interest or low priority to the users seeing these places. The surfaces associated with the secondary places may be used for rendering content unobtrusively to users. As an example and not by way of limitation, the secondary places may be the places that hold very little attentional value to users or the places that users do not give a second glance to. The augmented reality systems may identify such secondary places by monitoring the behaviors of many users over a period of time and across a large enough sample set. The augmented reality systems may determine a heat-map of where users look in the environment and determine the secondary spaces based on the heat-map of the users. In particular embodiments, the augmented reality systems may identify places with repeating textural patterns (e.g., sidewalks, building fascia, appliance fronts, etc.) as secondary spaces for rendering digital content. The augmented reality systems may identify the secondary places using one or more related characteristics (e.g., repeating textural patterns) of the places and re-purposed these places to be useful and relevant by rendering digital content on one or more surfaces of these places. In particular embodiments, the images used to identify the surface may be obtained from a pre-recorded image database (e.g., a 3D map database) which may be generated using one or more cameras associated with a third-party system (e.g., a mapping vehicle).

In particular embodiments, the system may compare one or more properties of a surface with one or more criteria to determine whether the surface is suitable for rendering digital content. The one or more associated properties of the surface may include, for example, but are not limited to, a location, a size, a texture, a material type, a shape, a flatness metric, a lighting condition, a direction, a relative position to an object, an angle in a three-dimension space, an associated object, an associated person, an associated place, a blank space, a display content, a moving speed, etc. As an example and not by way of limitation, the system may compare the size of the surface with a threshold size to determine whether the surface is large enough for rendering a digital content. If the surface has a size greater than the threshold size, the system may render the digital content on the surface. As another example, the system may evaluate the texture and lighting condition of the surface to determine whether the surface is suitable for displaying digital content. As another example, the system may compare the angle of the surface in the three-dimensional space to a user viewpoint to determine whether content rendered on the surface can be clearly viewed from that user viewpoint. A surface that is visible from the user viewpoint may be used for rendering digital content for a user from that user viewpoint. As another example, the system may compare the moving speed of the surface (e.g., a bus surface) to a threshold speed. The surface may be used for the rendering digital content when its moving speed is slower than the threshold speed.

In particular embodiments, the system may evaluate one or more properties of a place associated with the identified surface. For example, if a surface is associated with a department store (e.g., a wall, a floor, or a road surface of the store) the system may use the surface for rendering digital content related to this department store (e.g., related products or brands). In particular embodiments, the system may evaluate the existing content of a surface (e.g., a billboard) to determine whether the surface should be used to render digital content. For example, the system may identify a billboard displaying content related to a particular brand. The system may render the same content in a virtual space corresponding to the billboard or may render a different content to replace the billboard content in the virtual space.

Figure 2:
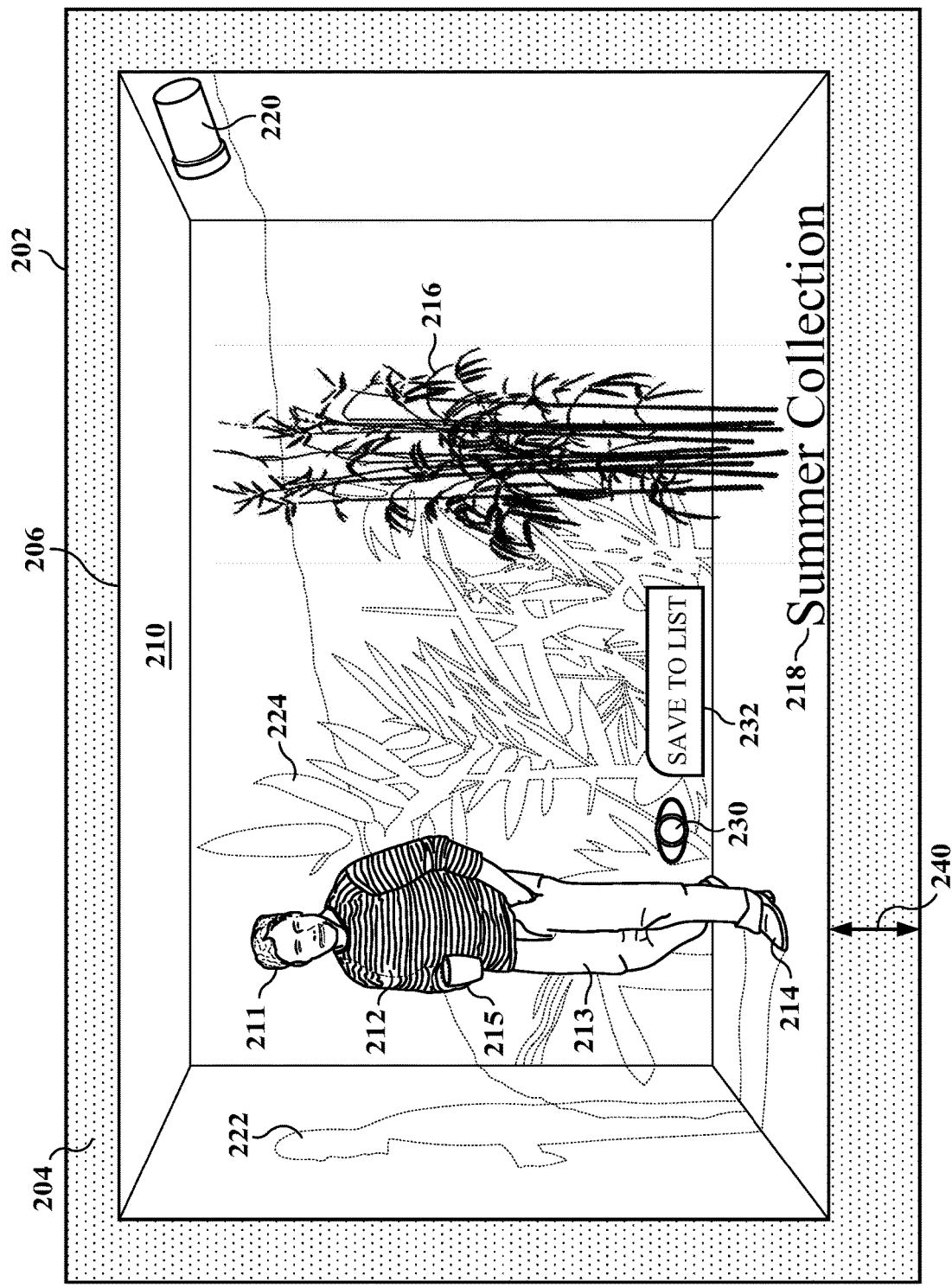
FIG. 2 illustrates an example 3D virtual storefront rendered on a surface.

FIG. 2 illustrates an example 3D virtual storefront 210 rendered on a surface 202. The surface 202 may have a textural pattern 204 (e.g., a brushed wall pattern, a brick wall pattern, a wood wall pattern) which is suitable for rendering 3D digital content. The surface 202 may have a size larger than a threshold size for rendering the 3D virtual storefront 210. The 3D virtual storefront may include a model 211 who is wearing a shirt 212, pants 213, shoes 214, and is holding a cup 215 in his hand. The 3D virtual storefront may include a bunch of bamboos 216 and one or more internal light sources 220. The internal light source 220 may be configured to shine light on the bamboos 216 and the model 221 and the bamboos 216 and the model 221 may be rendered based on properties of the light source 220 to make them have more realistic virtual effects. For example, the bamboos 216 and the model 211 may cast their shadows 224 and 222 on the virtual walls of the 3D virtual storefront 210 and make the storefront look more realistic. The surface 202 may be a blank wall of a department store. The displayed content (e.g., a shirt 312, pants 213, shoes 214, and a cup 215) of the 3D virtual storefront may be related to merchandises of the department store.

In particular embodiments, the 3D virtual storefront 210 may be a virtual display window and may be placed on any vertical surface that has a size lager than a threshold size. The 3D virtual storefront 210 may be a virtual front layer which appears to be a glass window of the 3D virtual store. The 3D virtual storefront may display a brand name 218 and other descriptions of one or more items on the virtual glass window of the storefront 210. In particular embodiments, the virtual glass window of the 3D virtual storefront may display a reflection image mapping the scene in front of the 3D virtual storefront. The reflection image may appear to be translucent and may be overlaid to the virtual glass window layer of the 3D virtual storefront. The reflection image may make the 3D virtual storefront have more realistic visual effect.

In particular embodiments, the 3D virtual storefront may have a distinct frame 206. The frame 206 may be aligned with the frame of the surface 202. In particular embodiments, the frame 206 may be raised above the floor for a threshold distance 240 (e.g., 1 foot to 2 feet) so it does not appear like a real doorway, which could become potentially hazardous since a viewer may try to walk through it. The 3D virtual storefront may have the background walls which provide dimensionality and stylization. In particular embodiments, the 3D virtual storefront 202 may further include an interactive icon 230 (e.g. an eye icon, a shopping cart icon, a to-do-list icon). A user looking at the 3D virtual storefront 202 may interact with the icon 230 to add one or more items to an action list or shopping list. For example, the user may be interested in the shirt 212 or the shoes 214. When the user gazes at the interactive icon 230, a "Save to List" dialog box 232 or text may pop up from the icon 230 to allow the user to add the shirt 212, the shoes 214 or other items to a list for later review of purchase.

In particular embodiments, the system may render the 3D virtual space (e.g., a 3D virtual storefront or display window) on an identified surface. The 3D virtual space may include one or more 3D display elements or 2D display elements including, for example, but not limited to, a model, a product (e.g., a furniture, clothes, jewelry), a brand name, a text description, a logo, an illustration, an artistical content, a dynamical visual effect, an interactive icon, a multimedia content, etc. The system may determine relative positions and orientations of one or more 3D display elements to the surface. The one or more 3D display elements may be positioned behind the surface. The system may determine the 3D virtual space based at least on the one or more properties (e.g., a size, an angle, a texture, a content, etc.) of the surface, a user viewpoint, and the relative positions and orientations of the 3D display elements to the surface. The user viewpoint used to determine the 3D virtual space may be the user viewpoint associated with the image from which the surface is identified or may be any viewpoint associated with a user near the surface. The 3D virtual space may appear behind the surface as seen from the user viewpoint. The system may render the 3D virtual space in a display area on the surface (e.g., a blank area, or an area with particular content). The 3D virtual space may be behind the surface and be visible through the display area on the surface as seen from the user viewpoint.

In particular embodiments, the 3D virtual space may include one or more internal light sources. The internal light source may shine light on the one or more 3D display elements (e.g., a model, a product) which may cast shadows in the 3D virtual space. The internal light sources may be positioned at a specific location and pointed in a specific direction based on the display arrangement of the display elements of the 3D virtual space. The system may render the 3D virtual space based on the virtual internal light source and the real-world ambient light within the scene (e.g., measured using image sensors or light-intensity sensors of the AR device) to give the 3D virtual space a more realistic visual effect.

In particular embodiments, the system may include a contextualized artificial intelligence (AI) assistant allowing a user to place digital objects into the real-world scene. The digital objects may be rendered on an artificial realty headset or a mobile computing device (e.g., a smartphone, a tablet, a computer). The user may control the objects parameters while the AI assistance may automatically determine the nature, type, and placement of the digital objects based at least on the real-world environment. As an example and not by way of limitation, a user may wear an augmented reality headset (e.g., glasses) while walking around an empty house. The augmented reality headset may use the contextualized artificial intelligence (AI) assistant to determine the 3D perception for the space that the user is in and render one or more pieces of 3D virtual furniture in that space. The user may control (e.g., using a controller, a voice command, a computer) the type, the relative position, and other parameters of the virtual furniture. The augmented reality headset may render the furniture based on the 3D perception of the space, the dimension of the furniture, and the user's input. As another example, the augmented reality headset may use the contextualized artificial intelligence (AI) assistant to automatically detect a wall of the space and render a virtual wall paper on the detected wall. The virtual wall paper may have a size that fits into the size of the wall and appear to be a real-world wall paper on the wall. The user may change different wall papers and evaluate the effects just like looking at wall papers in the real-world environment.

Figure 3A:
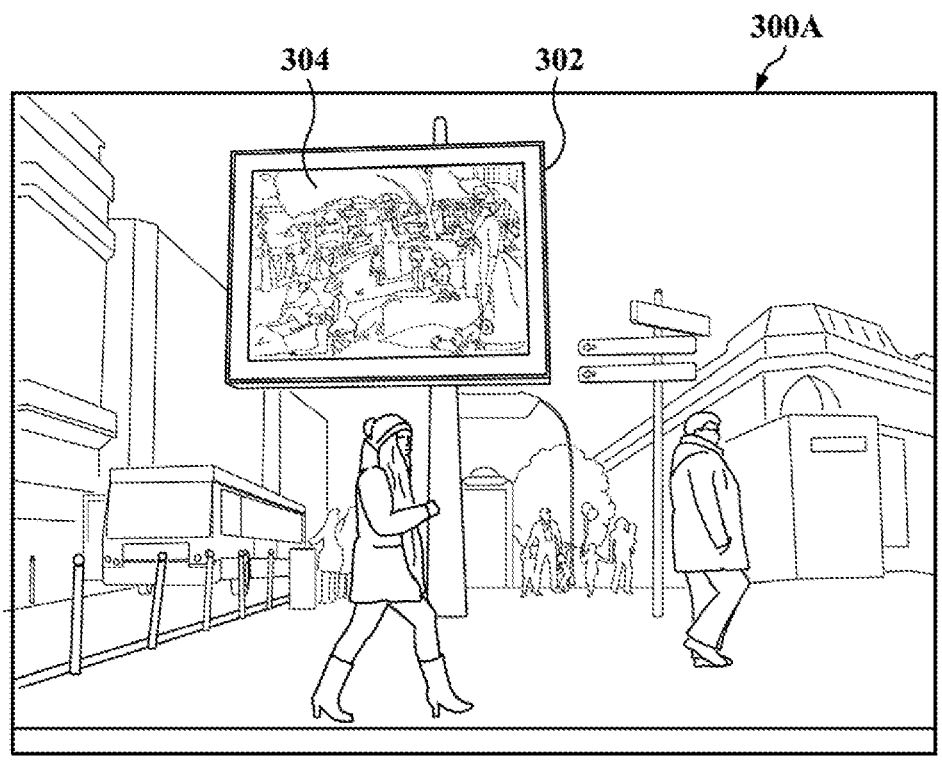
FIG. 3A illustrates an example content replacement on a billboard.

FIG. 3A illustrates an example content replacement 304 on a billboard 302. The scene 300A may be a scene viewed by a user wearing an artificial reality headset. The artificial reality system may identify the billboard 302 in the view of the user from an image 300A captured by the headset cameras from the user's viewpoint. The billboard 302 may originally include content related to a particular product or brand associated with an entity. The system may determine that the entity is not a paying member of the content service of an artificial reality platform or a social network platform. The system may determine a digital content to replace the original content of the billboard based on a status, a preference, a setting, or inputs of the user who is wearing the artificial reality headset and looking at the scene in the image 300A. For example, the system may determine that the user is interested in painting art and determine to render the painting art 304 on the billboard to replace the original display content of the billboard. The system may identify the size and proportion conditions of the billboard 302 and determine the appropriate size and proportion of the painting art 304 so that it would fit into the billboard 302. The system may identify the orientation of the billboard 302 from the user's viewpoint and render the painting art 304 based on the billboard's 302 orientation and the user's viewpoint. The system may identify the lighting condition of the billboard 302 (e.g., brightness) and the environment and determine an appropriate brightness for rendering the painting art 304. In particular embodiments, the system may receive a user input (e.g., gesture, voice command, setting button) from the user wearing the artificial reality headset and render digital content selected by the user. For example, the user may see the display content (e.g., a product of certain brand) of the billboard 302 and decided to change the content to some artwork. The user may instruct the system to select one or more digital content categories that the user is interested in and render the appropriate artwork on the billboard. The system may select or generate the digital content based on the user's reference and interests setting stored on the system.

Figure 3B:
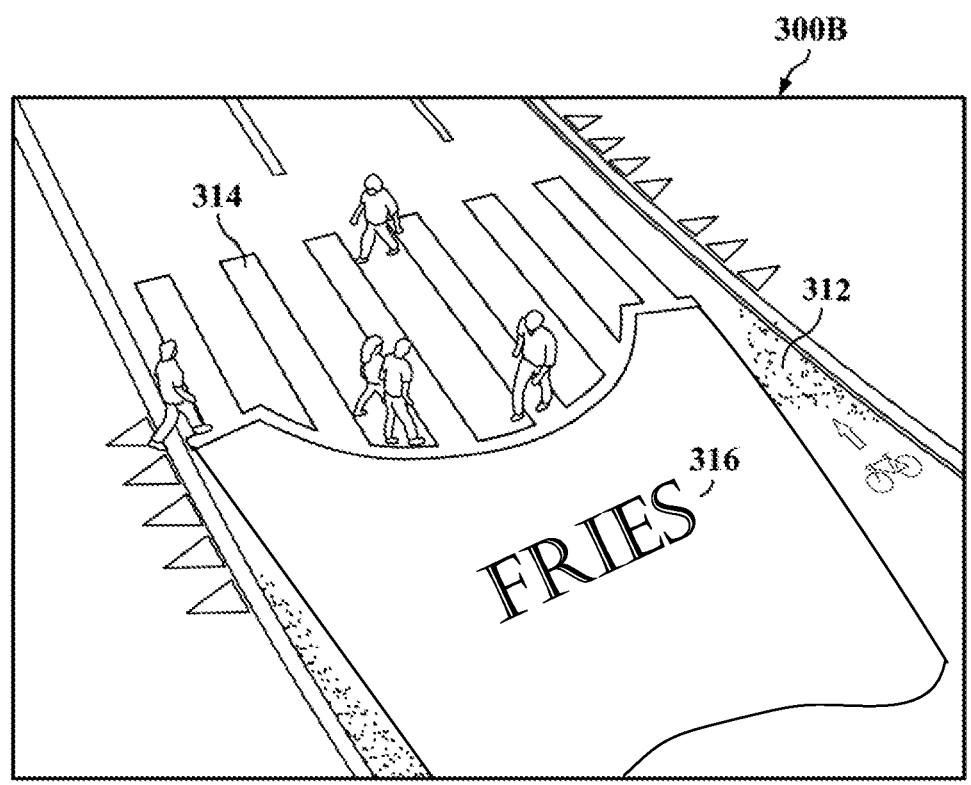
FIG. 3B illustrates an example content rendered on a road surface.

FIG. 3B illustrates an example content rendered on a road surface. The scene in the image 300B may be a scene viewed by a user wearing an artificial reality headset. The user may view the scene from a viewpoint higher than the road surface 312 (e.g., a tall-building window or a building top, a bridge). The system may identify the road surface 312 having the painted crosswalk lines 314 using one or more images captured by cameras (e.g., headset cameras) from the user's viewpoint. The system may use a part of the road surface to render an illustration 316 (e.g., a food package). The rendered illustration 316 may occupy a portion of the road surface 312 as an addition to the painted crosswalk lines 314, which may be creatively used to indicate fries figuratively. In particular embodiments, the system may determine the illustration 316 based on a user status and information about the local area. For example, the system may determine that the user is looking out of an office building near a lunch time and infer that the user is likely to be hungry. The system may further determine, based on the history data (e.g., a search history) of the user, that the user used to have fast food lunch. The system may further search the local map and determine that a fast food restaurant is within a walking distance to the user (e.g., less than 0.5 miles). The system may determine to render the illustration 316 (related to the nearby restaurant) on the road surface 312 to the user based on above information.

Figure 3C:
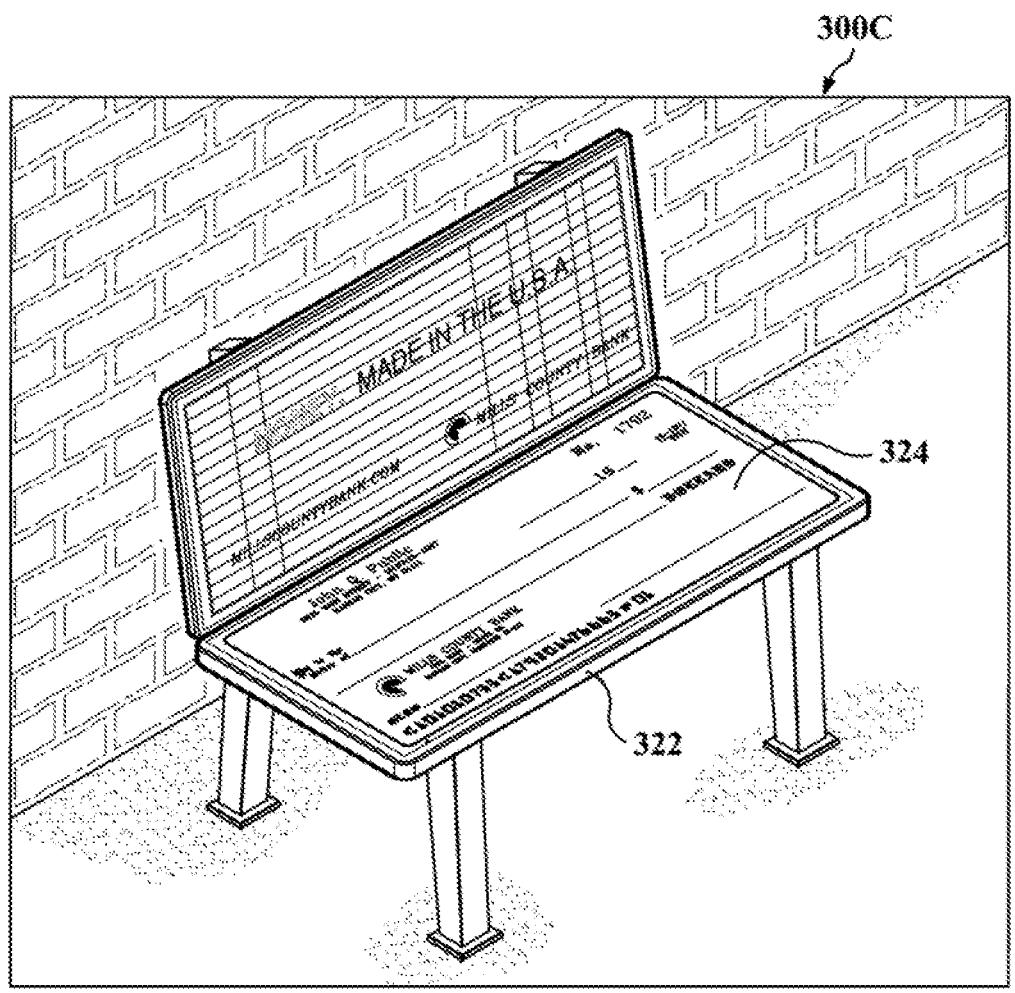
FIG. 3C illustrates an example 3D content rendered on a bench.

FIG. 3C illustrates an example 3D content rendered on a bench 322. The scene in the image 300C may be a scene viewed by a user wearing an artificial reality headset. The system may identify the bench 322 in the view of the user using the image 300C captured by the headset camera from the user's viewpoint. The system may render a 3D virtual content (e.g., a checkbook 324 of a particular bank) on the surfaces of the bench 322. The system may determine, based on interaction information of the user with a mobile device, a social network platform, or the artificial reality headset, that the user is looking for a bank to open a new account. The system may further determine, using a local map, that a particular bank is near the user's current location. The system may determine to render the 3D checkbook 324 on the bench to the user.

In particular embodiments, the system may use a machine learning model to identify a real-world surface with existing display content (e.g., ads). The machine learning model may be trained to identify particular contents (e.g., logos, brands, website links, phone numbers) from the environmental images. The machine learning model may have a 3D perception of the identified surface and may calculate 3D display information for replacement content (e.g., a position, a size, a proportion, an orientation, an angle to a user viewpoint). In particular embodiments, the system may use the machine learning model to process images from a 3D map generated by a third-party system. The system may identify the surfaces with existing display content using machine learning model and remap the environment based on the existing 3D map and the identified surfaces. The system may further use an object recognition model and a localization system for remapping the environment. In particular embodiments, the system may identify the surfaces based on images captured by one or more cameras associated with an artificial reality headset or a third-party system (e.g., a mapping vehicle). The images may be captured by the cameras and processed by the machine learning model in real-time while the system generates and renders the replacement content.

In particular embodiments, the system may render digital display content on the identified surface and the rendered content may replace the existing display content on the surface. The identified surface may have a blank space or may be fully occupied by the existing display content. In particular embodiments, the system may render digital content on the identified surface in addition to the existing display content of the surface. In particular embodiments, the system may determine the digital content for the identified surface based on the existing content and one or more associated properties of the existing content. As an example and not by way of limitation, the system may identify a billboard displaying content associated with a particular brand. The system may determine whether the associated entity of this brand meets one or more conditions (e.g., being a subscriber of a service of a social network platform, being a paying member of an artificial reality platform). When the associated entity meets these conditions, the system may render a digital content including the same or similar content with the existing display content of the billboard on the identified surface. As another example, when the associated entity does not meet the conditions, the system may determine a digital content that is different from (e.g., different products from other brands) the existing display content of the surface. The system may render the determined digital content on the real-word surface or a corresponding virtual surface to replace the existing display content in a virtual space. In particular embodiments, the system may render the determined digital content on the identified surface using an artificial reality headset (e.g., an augmented reality headset). In particular embodiments, the system may render the determined digital content on a virtual surface of a virtual space (e.g., by a virtual reality headset) corresponding to the real-world surface.

In particular embodiments, the system may determine a visual effect or additional content based on the existing display content. For example, the system may generate a static or dynamic visual effect (e.g., a rainbow effect, a dynamic effect, a 3D visual effect, a virtual character) on the identified surface to enhance to the display of the existing display content. In particular embodiments, the system may generate creative content that can be programmatically inserted into a scene through a semantic tagging process.

In particular embodiments, the system may use artificial intelligence (AI) modules and machine learning (ML) models to identify the content to be replaced (e.g., content associated with particular products or brands) and determine the correctly sized and proportioned replacement content. For example, the AI and ML models may identify informational signage from advertisement billboards and generate corresponding content or replacement content to be rendered at the same place or a corresponding virtual place. In particular embodiments, the system may cooperate with servers in a cloud to identify the surface and replace the existing content with replacement content. In particular embodiments, the identification of surfaces and content replacement may be performed locally in the artificial reality system (e.g., a headset) and in real-time.

In particular embodiments, the digital content to be displayed to a user may be determined based on user information associated with that user. The user information that may be used for determining the digital content may include, for example, but is not limited to, a social network profile, a search history, a browsing history, a purchase history, a user interest, a preference, a user setting, an emotion state, a behavioral state of the user, a time related to the behavioral state of the user, an interaction of the user with an object, an indication of the user, a user input, a gesture, a command, a navigation route, a target place of a navigation system, etc. The customized digital content determined based on the user information may be more relevant to the user. In particular embodiments, the digital content may be determined based on demographic information of the user (e.g., an age, a gender, an education background). In particular embodiments, the digital content may be determined based on information of other people (e.g., friends, contact list, family members) related to the user through a social graph of a social network.

In particular embodiments, the digital content may be based on the user's setting about interests or preferences. The system may determine that a user is paying member of a service provided by an artificial reality platform or a social network platform. The system may generate digital content of one or more categories (e.g., artwork, images, multimedia content), that the user prefers, to replace content of other categories (e.g., ads), that the user prefers to avoid. In particular embodiments, the system may generate pro-social charitable content (e.g., classic artworks, curated collections of artists, sculptures) to selectively replace some advertisements. For example, the system may render artistic sculpture or other works in empty public spaces.

In particular embodiments, the system may receive one or more inputs from a user looking at the rendered digital content. For example, the system may track the vergence movement of the user using an eye tracking system to determine the content that the user is looking at. If the user looks at a particular content (e.g., a product) for a threshold amount of time, the system may display a pop-up dialog box or menu related to that content. The user may interact with dialog box or menu (e.g., an eye gaze, a voice command/instruction, a hand gesture) to add one or more items related to the displayed content to a list for later review or purchase. In particular embodiments, upon receipt of an instruction from the user, the system may automatically translate the objects as seen by the user into a follow-up note or list for the user to review at a later time.

In particular embodiments, the system may determine, generate, or select digital content (e.g., images, poems, quotations, thoughts) that may inspire a user's daily life or work. The system may provide a service for users to subscribe to receive the digital content of the daily inspiration. When the system determines that the user is a subscriber of the service, the system may send the digital content to the user. In particular embodiments, the system may allow the user to select the themes or preferences of the inspiring digital content. The user may customize the digital content by types, categories, contents, or other factors. For example, the user may select which poets' poems should be included or excluded. The user may customize the digital content to include to images, texts, or special visual effect (e.g., rainbow). The system may customize the digital content according to the user's setting and selections. The digital content may further include educational information (e.g., a lecture summary) or orientation messages (e.g., navigating information).

In particular embodiments, the system may use AI/ML or rule-based procedural approaches to generate and render virtual objects into the real world and the rendered virtual objects may be visible only to a particular user. In particular embodiments, the system may use simple random selection to determine the digital content. The system may generate the daily inspiration in a new narrative form and let the user take that inspiration as insight in the contexts of the real world. For example, the system may render digital content encouraging the user to recycle paper when the user is holding a paper food bag and approaching a dumpster. As another example, the system may sprinkle virtual objects (e.g., flowers, rainbows, heart shapes) into the user's view when the user is looking at a particular view (e.g., a yard, a mountain, a children picture) and turn the scene in the user's view in to a meaningful narrative story to the user. As another example, the system may project work-life balance quotation in an office environment of the user and turn the work-life activity history of the user into a story of courage and growth. As another example, the system may display interesting, humorous, ironic, or aspirational observations to the user and the displayed content may be shareable on social media as a new narrative story. In particular embodiments, the system may determine the digital content for a user based on the user's friends on a social network platform. For example, the system may select the content (e.g., poetry, images, options) that the user's friends have liked, shared, or subscribed and render the selected content to the user.

In particular embodiments, the system may send the digital content to the user on a daily basis, on a predetermined time interval, or a time interval determined by the user. In particular embodiments, the system may send to the digital content to the user based on a time interval adaptively determined by the system (e.g., based on user mood or emotional status). In particular embodiments, the system may send the digital content to the user based on a trigger condition related to the mood or an emotional metric of the user detected by the system. The system may use one more sensors (e.g., microphones, motion sensors, eye tracking systems, cameras) to determine the mood or emotional status of a user using, for example, a detected voice (e.g., a cry, a sigh, a laughter, a cheer), a walking speed, a body gesture or motion (e.g., bowing head, leaning back in a chair), a behavior (e.g., crying with tears in eyes), an eye status (e.g., sleepy eyes, angry eyes), etc. The system may send the inspirational digital content to the user more frequently when the user is in a relatively bad mood or a nonoptimal emotional status.

In particular embodiments, the system may identify the secondary places that the user may have low interest in and consider low priority (e.g., relevant but not important) in the view of the user. The system may use these secondary places for displaying the digital content to inspire the user. In particular embodiments, the digital content may be displayed as background in the scene viewed by the user. In particular embodiments, the system may display the digital content to the user at locations that may surprise the user.

In particular embodiments, with the user's permission, the system may provide a feedback information channel to the content providers by tracking and collecting the user's reaction or interaction (with the rendered digital content) when the user looks at the content. In particular embodiments, the system may determine a status of a user when the user is near the three-dimensional virtual space rendered on a surface in front of the user. The status of the user comprises, for example, but is not limited to, an emotional state, a behavioral state of the user, a time related to the behavioral state of the user, an interaction of the user with an object, an indication from the user, a user input, a setting choice of the user, a gesture, a vergence distance, a command, etc. For example, the system may use gaze linger and head tilt to gauge different emotional reactions and/or interest level of a user to the rendered digital content. As another example, the system may detect laughter or other biometric signals of a user to determine the user's reaction and to rate the rendered content. As another example, the system may use vergence distance to determine whether the user did read a displayed phone number, a website address, or a promotion message. In particular embodiments, the system may calculate one or more impression metrics based on the measured status of the user. The impression metrics comprise, for example, but are not limited to, a time, a location, a gazing duration, a gazing direction, a gazing sequence, an attention metric for an element, a time interval since last impression, a reaction metric of the user, etc.

In particular embodiments, the system may include an eye tracking system for tracking the user's eyes in real-time. The eye tracking system may be a 3D eye tracking system tracking the user's eye movements (e.g., a gazing direction, a gazing angle, convergence) and determine where the user is looking at (e.g., a vergence distance or a gazing point). In particular embodiments, the artificial reality headset system may use a machine learning (ML) based approach for eye tracking. The headset system may take a sequence of images of the eyes of the user wearing the headset (e.g., using a 3D eye tracking system) and use the machine learning (ML) algorithm to process the images and output vergence information. For example, the machine learning (ML) algorithm may include an inference model to determine the vergence distance and gazing point of the user. In particular embodiments, the headset system may include a hybrid approach combining 3D eye tracking and ML-based eye tracking.

In particular embodiments, the artificial reality system may determine vergence distance and gazing point of the user using a combination of approaches. The approaches may include, for example, but are not limited to, eye tracking based approaches (e.g., 3D eye tracking, ML based eye tracking), head position/movement, hand position/movement, body position/movement), and content-based approaches (e.g., Z-buffer, face/object recognition, developer provided information). U.S. patent application Ser. No. 16/132,153, entitled "Vergence Determination," filed 14 Sep. 2018, which is incorporated by reference as an example only and not by way of limitation, discloses examples of determining vergence distance or gazing point using different combination of approaches.

In particular embodiments, the system may use the eye tracking system to measure the user impression of the rendered digital content. The system may aggregate the impression hit-data to determine the effectiveness of the rendered content. For example, if a user is drawn to an image or text, the system may determine whether the user does read the phone number which is included in the rendered content. The system may track whether the user saves the link in the content for later follow-up or put something on the to-do list or shopping list related to the rendered content (e.g., a product).

In particular embodiments, the system may (with the user's permission) track the follow-on activities of the user after the user has seen the rendered digital content. The system may determine a correlation between a user behavior (e.g., a purchase of the product displayed in the digital content or a purchase of a competitor product) and the user's impression (e.g., time of impression, duration of gazing, reactions, emotional states) on the rendered digital content. For example, the system may correlate a fact that the user is holding a product in hand or buying a product 30 minutes after seeing a digital content related to that product. The system may determine the correlations between the user impressions of the digital content and the actual actions after the impressions (e.g., buying a related product or buying a competing product). The system may also determine the correlation of an actionable event (e.g., seeing a product or service physically) and the actual actions after the impressions (e.g., buying a related product or picking a competing product).

In particular embodiments, the system may aggregate the impression metrics of the user and the follow-on activities of the user to generate a valuable data set for the content providers. The system may use aggregated eye tracking data to give the content providers an effective measure of effectiveness of the content strategy of the media campaigns of content providers or the media campaigns of their competitors. For example, for a paying member entity, the system may not replace the existing display content related to that entity on the real-world places (e.g., billboards) or a virtual space. The system may track the user's reactions to measure the user impressions, for example, a selection on an interactive icon, a gesture, a voice command, a vergence movement, a user input, etc. The system may also track follow-on activities to generate valuable data for the related entity. The system may further aggregate demographic and impressions data to gauge the effectiveness of the content. In particular embodiments, the system may predict the future behaviors the user based on the aggregated data related to that user. For example, the system may determine how many number of impressions (and of what type of content) may lead to a purchase action for the user.

In particular embodiments, the system may display the same digital content at different locations or/and at different time or/and to different users to perform an AB testing on the digital content of an advertising campaigns. The system may measure the effectiveness of the campaigns by collecting the user's reactions and follow-on activities. The system may aggregate the collected data and correlate the data to consumer demographics and location data.

Figure 4:
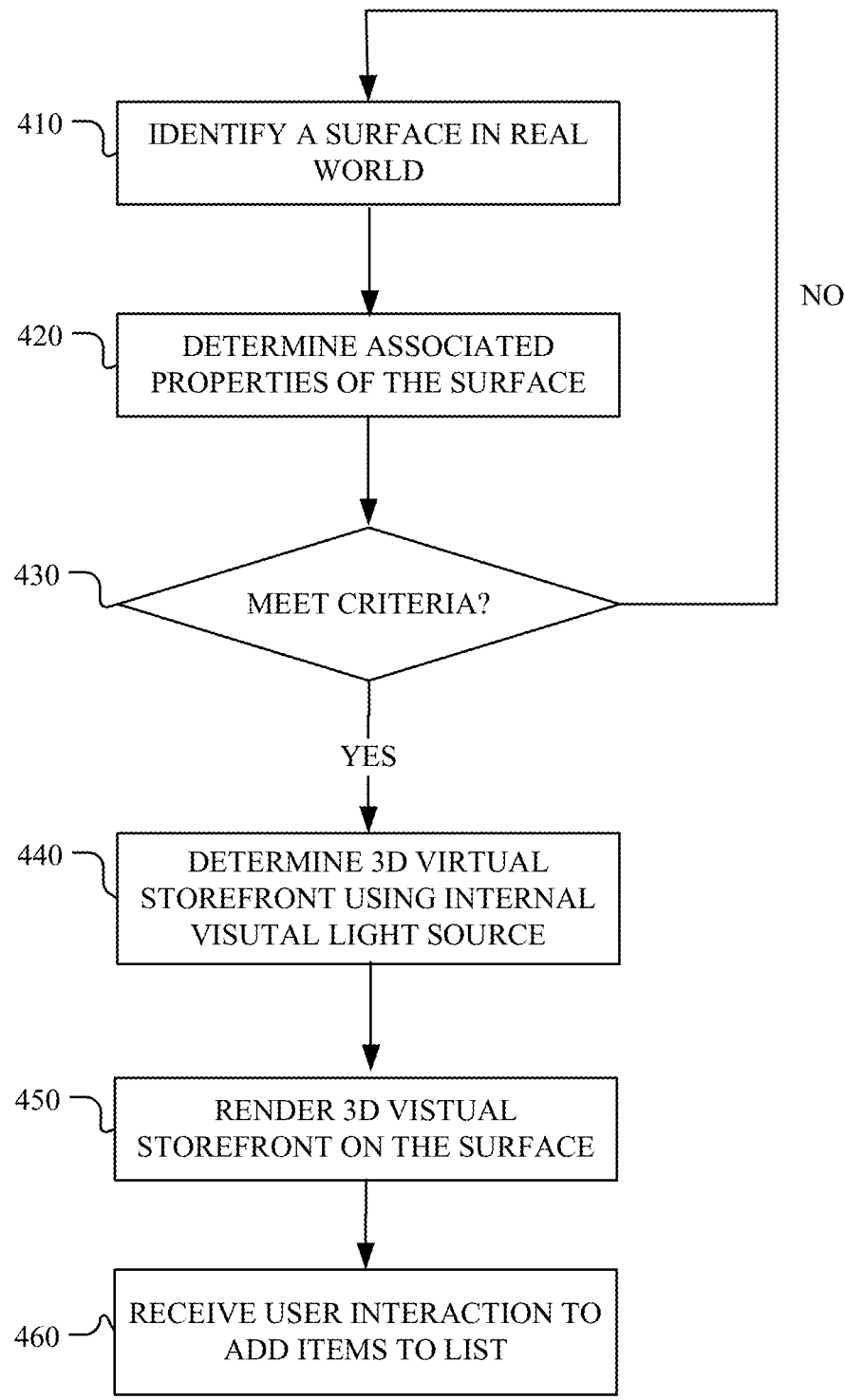
FIG. 4 illustrates an example method of rendering a 3D virtual storefront on a surface.

FIG. 4 illustrates an example method 400 of rendering a 3D virtual storefront on a surface. At step 410, the artificial reality system may use a machine learning model to process images to identify a real-world surface (e.g., a billboard, a bus surface, a building, a road surface, etc.). The images may be captured using one or more cameras associated with an artificial reality headset or may be accessed from an image database (e.g., a 3D map) generated by a third-part system (e.g., a mapping vehicle). At step 420, the system may determine one or more associated properties (e.g., a size, a texture, a lighting condition, an angle in a three-dimension space, an associated place, a blank space, a display content, etc.) of the surface. At step 430, the system may compare the associated properties of the surface to one or more criteria to determine whether the surface is suitable for rendering 3D virtual content. For example, the system may determine that the surface meets the criteria for rendering 3D virtual content if the surface is larger than a threshold size, has an appropriate view angle to a user viewpoint, and is associated with a wall of a department store.

As step 440, the system may generate a 3D virtual storefront based at least on the properties of the surface (e.g., a size, a view angle, an associated store) and a user viewpoint for which the 3D virtual storefront will be rendered. The 3D virtual storefront may include one or more 3D display elements (e.g., a model, a product) or/and one or more 2D display elements (e.g., a brand name, a logo). The display elements may be related to merchandises of the associated department store. The system may calculate the relative positions and orientations of one or more display elements (e.g., 3D or 2D display elements) to the surface and position the display elements behind the surface. In particular embodiments, the 3D virtual storefront may further include one or more internal light sources which make the 3D virtual effect more realistic. For example, the internal light sources may shine light on the 3D display elements (e.g., a model, a product) which may cast shadows in the 3D virtual space and make the virtual effect appear more real.

At step 450, the system may render the 3D virtual storefront in a display area of the surface. The display area may cover the whole surface, a blank portion of the surface, or a portion of the surface with display content. The rendered 3D virtual storefront may have a frame corresponding to the display area and the frame may be aligned with a frame of the surface. The display area (and the frame) may have a distance (e.g., 1 foot, 2 feet) to the floor. The rendered 3D virtual storefront may appears being raised up from the floor, and therefore, is safer by avoiding people to physically walk into the storefront. In particular embodiments, the 3D virtual storefront may be rendered for a user viewpoint associated with the image used to identify the surface. In particular embodiments, the 3D virtual storefront may be render for any user viewpoint associated with a user near the surface and wearing an artificial reality headset. The rendered 3D virtual space including the display elements may be rendered in a display area on the surface. The 3D virtual space may be behind the surface and be visible from the display area on the surface as seen from the user viewpoint.

The rendered 3D virtual storefront may include an interactive icon (e.g., an eye icon, a shopping cart icon, a notebook icon, etc.). At step 460, the system may receive one or more inputs from a user looking at the 3D virtual storefront. For example, the system may track the vergence movement of the user using an eye tracking system to determine where the user is looking. If the user looks at the interactive icon for a threshold amount of time, the system may display a pop-up dialog box or menu related to one or more items displayed in the 3D virtual storefront. The user may interact with dialog box or menu (e.g., an eye gaze, a voice command, a hand gesture) to add one or more items to a list for later review or purchase. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for rendering a 3D virtual storefront on a surface including the particular steps of the method of FIG. 4, this disclosure contemplates any suitable method for rendering a 3D virtual storefront on a surface including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
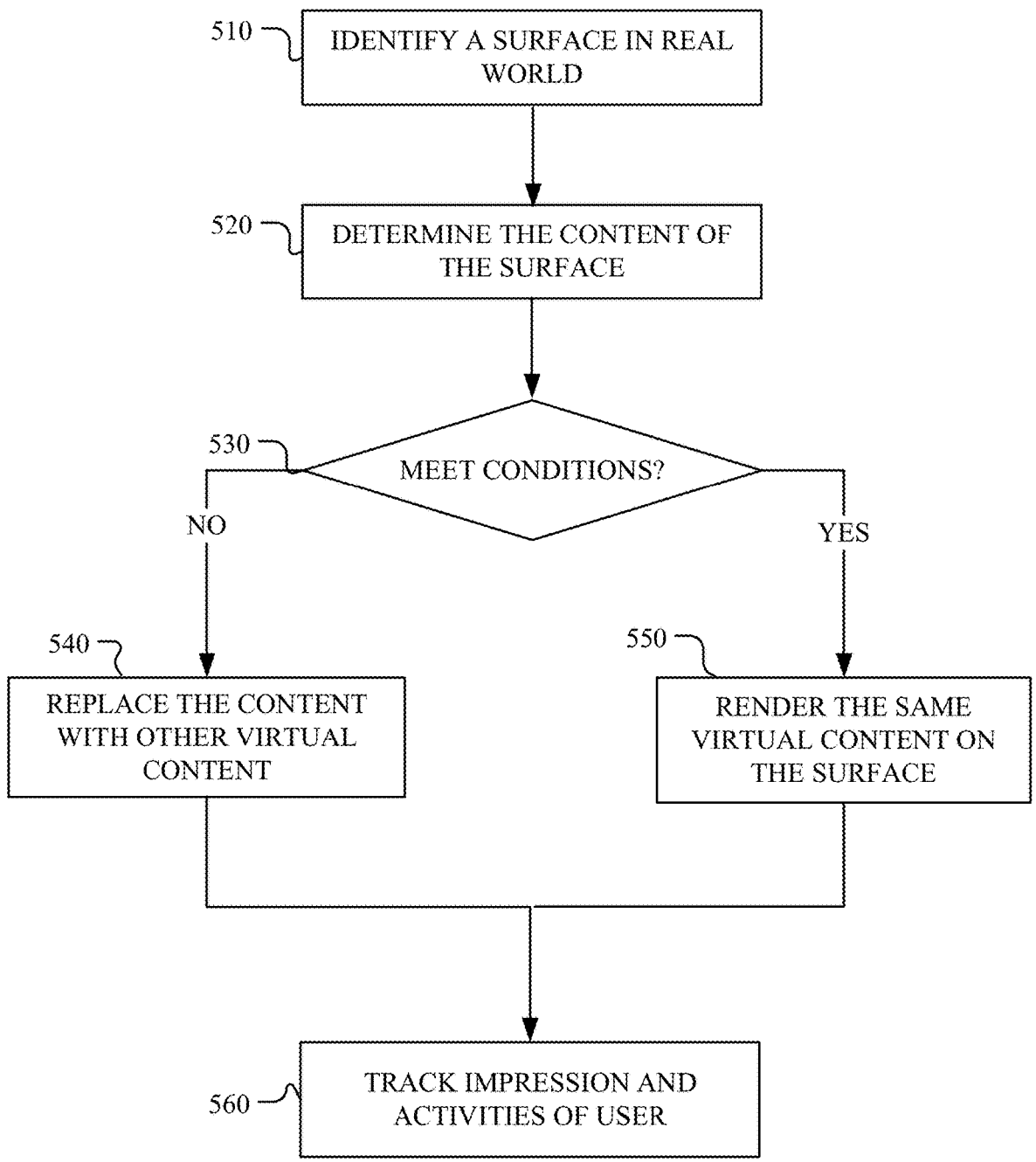
FIG. 5 illustrates an example method of rendering or replacing content for a surface.

FIG. 5 illustrates an example method of rendering or replacing content for a surface. At step 510, the system may identify a real-world surface (e.g., a billboard, a bus, a wall, a section floor, etc.) which may include existing display content (e.g., a product, a brand). At step 520, the system may analyze the content of the surface to identify the related products or entities. For example, the system may identify that the display content of the identified surface is related to a particular entity. As step 530, the system may determine whether the related entity of the existing content meets one or more conditions, for example, being a paying member of a content service of the artificial reality platform or a social network platform. At step 540, when the system determines that the entity does not meet the conditions, the system may generate or determine digital content that is different with the existing content (e.g., being associated with another brand, or artwork not related to any brand) to replace the existing display content. The system may render the digital content on the real-world surface (e.g., by an augmented reality headset) or a corresponding virtual surface (e.g., in a virtual reality space). At step 550, when the system determine that the entity meets the conditions, the system may keep the existing display content or render the same content on a corresponding virtual surface of a virtual space. At step 560, the system may track the impression data and the follow-on activities of the user with the user's permission. The system may determine further digital content based on the collected impression data and follow-on activates of the user. In particular embodiments, the system may perform all or some of the steps in cooperation with servers on cloud. In particular embodiments, the system perform all or some of the steps locally in the artificial reality system (e.g., a headset). Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for rendering or replacing content for a surface including the particular steps of the method of FIG. 5, this disclosure contemplates any suitable method for rendering or replacing content for a surface including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
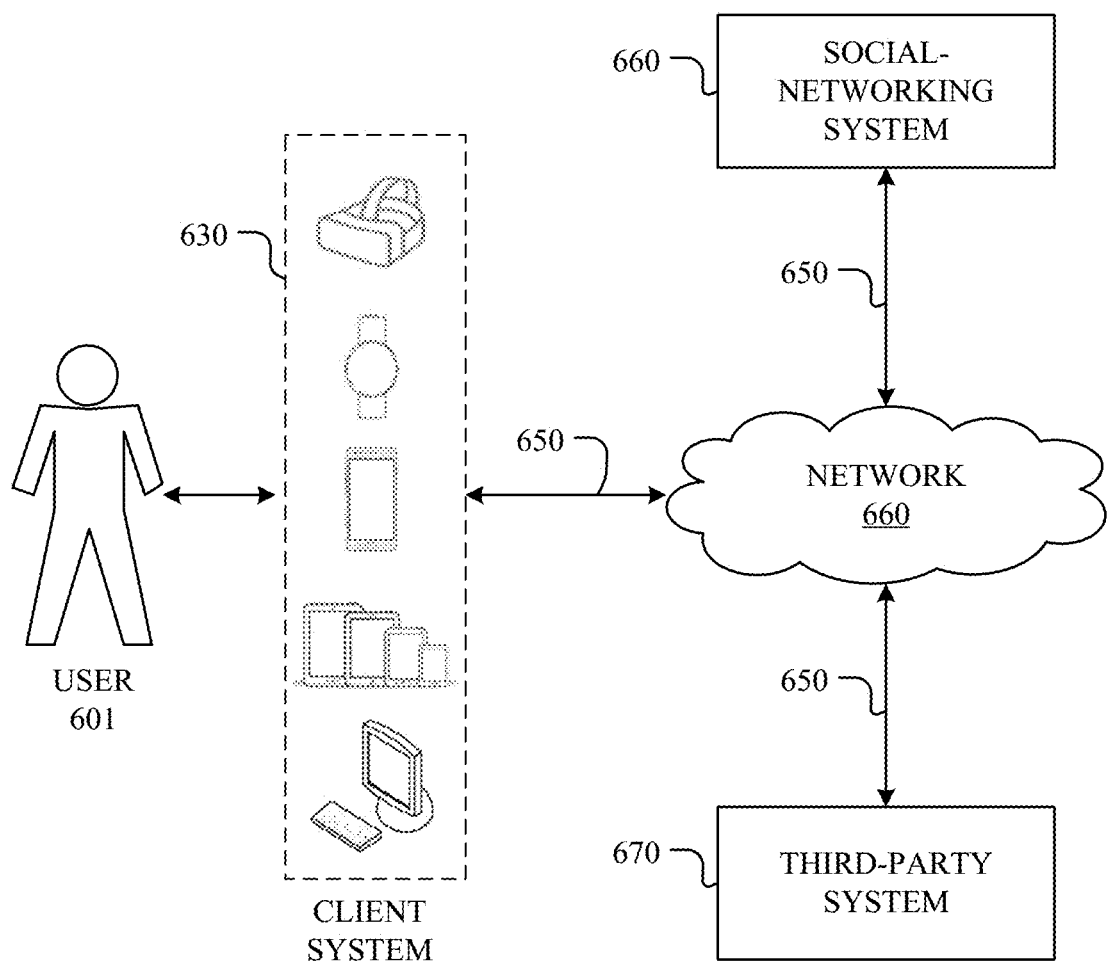
FIG. 6 illustrates an example network environment associated with a social-networking system.

FIG. 6 illustrates an example network environment 600 associated with a social-networking system. Network environment 600 includes a user 601, a client system 630, a social-networking system 660, and a third-party system 670 connected to each other by a network 610. Although FIG. 6 illustrates a particular arrangement of user 601, client system 630, social-networking system 660, third-party system 670, and network 610, this disclosure contemplates any suitable arrangement of user 601, client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of users 601, client systems 630, social-networking systems 660, third-party systems 670, and networks 610, this disclosure contemplates any suitable number of users 601, client systems 630, social-networking systems 660, third-party systems 670, and networks 610. As an example and not by way of limitation, network environment 600 may include multiple users 601, client system 630, social-networking systems 660, third-party systems 670, and networks 610.

In particular embodiments, user 601 may be an individual (human user), an entity (e.g., an enterprise, business, or third-party application), or a group (e.g., of individuals or entities) that interacts or communicates with or over social-networking system 660. In particular embodiments, social-networking system 660 may be a network-addressable computing system hosting an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. In particular embodiments, social-networking system 660 may include an authorization server (or other suitable component(s)) that allows users 601 to opt in to or opt out of having their actions logged by social-networking system 660 or shared with other systems (e.g., third-party systems 670), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 670 may be a network-addressable computing system. Third-party system 670 may be accessed by the other components of network environment 600 either directly or via network 610. In particular embodiments, one or more users 601 may use one or more client systems 630 to access, send data to, and receive data from social-networking system 660 or third-party system 670. Client system 630 may access social-networking system 660 or third-party system 670 directly, via network 610, or via a third-party system. As an example and not by way of limitation, client system 630 may access third-party system 670 via social-networking system 660. Client system 630 may be any suitable computing device, such as, for example, a personal computer, a laptop computer, a cellular telephone, a smartphone, a tablet computer, or an augmented/virtual reality device.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

Figure 7:
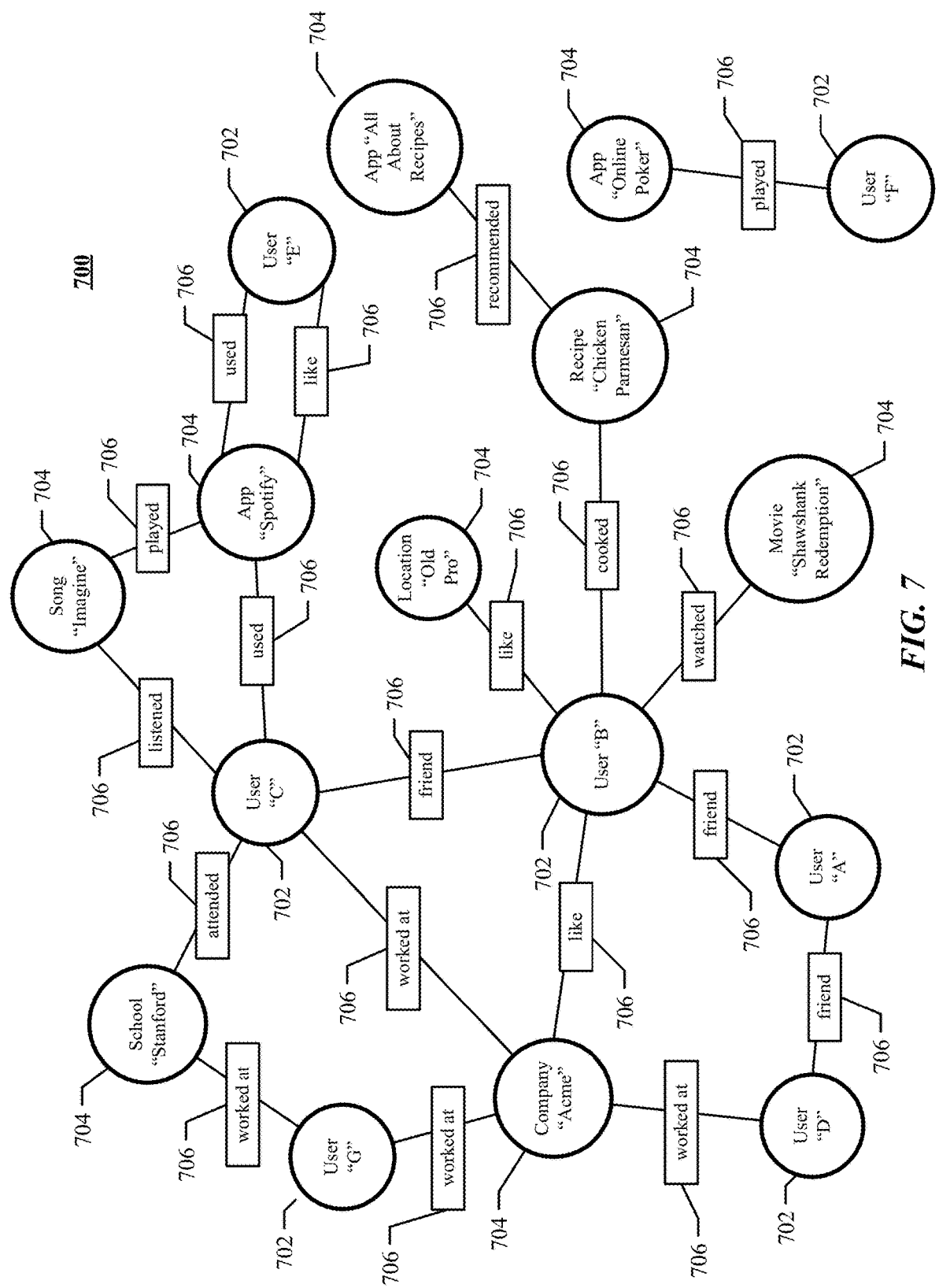
FIG. 7 illustrates an example social graph.

FIG. 7 illustrates example social graph 700. In particular embodiments, social-networking system 660 may store one or more social graphs 700 in one or more data stores. In particular embodiments, social graph 700 may include multiple nodes—which may include multiple user nodes 702 or multiple concept nodes 704—and multiple edges 706 connecting the nodes. Each node may be associated with a unique entity (i.e., user or concept), each of which may have a unique identifier (ID), such as a unique number or username. Example social graph 700 illustrated in FIG. 7 is shown, for didactic purposes, in a two-dimensional visual map representation. In particular embodiments, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular embodiments, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular embodiments, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 630 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706. The degree of separation between two objects represented by two nodes, respectively, is a count of edges in a shortest path connecting the two nodes in the social graph 700. As an example and not by way of limitation, in the social graph 700, the user node 702 of user "C" is connected to the user node 702 of user "A" via multiple paths including, for example, a first path directly passing through the user node 702 of user "B," a second path passing through the concept node 704 of company "Acme" and the user node 702 of user "D," and a third path passing through the user nodes 702 and concept nodes 704 representing school "Stanford," user "G," company "Acme," and user "D." User "C" and user "A" have a degree of separation of two because the shortest path connecting their corresponding nodes (i.e., the first path) includes two edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 660 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 660 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704. In particular embodiments, social-networking system 660 may store an edge 706 in one or more data stores. In particular embodiments, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

In particular embodiments, social-networking system 660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 660 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 660 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 660 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 660 may calculate a coefficient based on a user's actions. Social-networking system 660 may monitor such actions on the online social network, on a third-party system 670, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 660 may calculate a coefficient based on the user's actions with particular types of content. The content may be associated with the online social network, a third-party system 670, or another suitable system. The content may include users, profile pages, posts, news stories, headlines, instant messages, chat room conversations, emails, advertisements, pictures, video, music, other suitable objects, or any combination thereof. Social-networking system 660 may analyze a user's actions to determine whether one or more of the actions indicate an affinity for subject matter, content, other users, and so forth. As an example and not by way of limitation, if a user frequently posts content related to "coffee" or variants thereof, social-networking system 660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 660 may calculate a coefficient based on the type of relationship between particular objects. Referencing the social graph 700, social-networking system 660 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than a user nodes 702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 660 may determine that the user has a higher coefficient with respect to the first photo than the second photo because having a tagged-in-type relationship with content may be assigned a higher weight and/or rating than having a like-type relationship with content. In particular embodiments, social-networking system 660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 660 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (i.e., fewer degrees of separation) may have a higher coefficient than entities that are further apart in the social graph 700.

In particular embodiments, social-networking system 660 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 630 of the user). A first user may be more interested in other users or concepts that are closer to the first user. As an example and not by way of limitation, if a user is one mile from an airport and two miles from a gas station, social-networking system 660 may determine that the user has a higher coefficient for the airport than the gas station based on the proximity of the airport to the user.

In particular embodiments, social-networking system 660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 660 may provide information that is relevant to user's interests and current circumstances, increasing the likelihood that they will find such information of interest. In particular embodiments, social-networking system 660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 670 (e.g., via an API or other communication channel), or from another suitable system. In response to the request, social-networking system 660 may calculate the coefficient (or access the coefficient information if it has previously been calculated and stored). In particular embodiments, social-networking system 660 may measure an affinity with respect to a particular process. Different processes (both internal and external to the online social network) may request a coefficient for a particular object or set of objects. Social-networking system 660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/502,093, filed 11 Aug. 2006, U.S. patent application Ser. No. 12/867,027, filed 22 Dec. 2010, U.S. patent application Ser. No. 12/867,265, filed 23 Dec. 2010, and U.S. patent application Ser. No. 13/622,769, filed 1 Oct. 2012, each of which is incorporated by reference.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 660). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 660. In addition or as an alternative, the social action may be promoted outside or off of social-networking system 660, where appropriate. In particular embodiments, a page may be an on-line presence (such as a webpage or website within or outside of social-networking system 660) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 660. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 660) or RSVP (e.g., through social-networking system 660) to an event associated with the advertisement. In addition or as an alternative, an advertisement may include social-networking-system content directed to the user. For example, an advertisement may display information about a friend of the user within social-networking system 660 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 660 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 660.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 660 to identify those users. In addition or as an alternative, social-networking system 660 may use user-profile information in social-networking system 660 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 660, off or outside of social-networking system 660, or on mobile computing devices of users. When on or within social-networking system 660, such targeting may be directed to users' news feeds, search results, e-mail or other in-boxes, or notifications channels or may appear in particular area of web pages of social-networking system 660, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 660, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 660 or explicit connections of a user to a node, object, entity, brand, or page on social-networking system 660. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node #04 corresponding to a particular photo may have a privacy setting specifying that the photo may only be accessed by users tagged in the photo and their friends. In particular embodiments, privacy settings may allow users to opt in or opt out of having their actions logged by social-networking system 660 or shared with other systems (e.g., third-party system 670). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 670, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 662 may be authorization/privacy servers for enforcing privacy settings. In response to a request from a user (or other entity) for a particular object stored in a data store 664, social-networking system 660 may send a request to the data store 664 for the object. The request may identify the user associated with the request and may only be sent to the user (or a client system 630 of the user) if the authorization server determines that the user is authorized to access the object based on the privacy settings associated with the object. If the requesting user is not authorized to access the object, the authorization server may prevent the requested object from being retrieved from the data store 664, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 8:
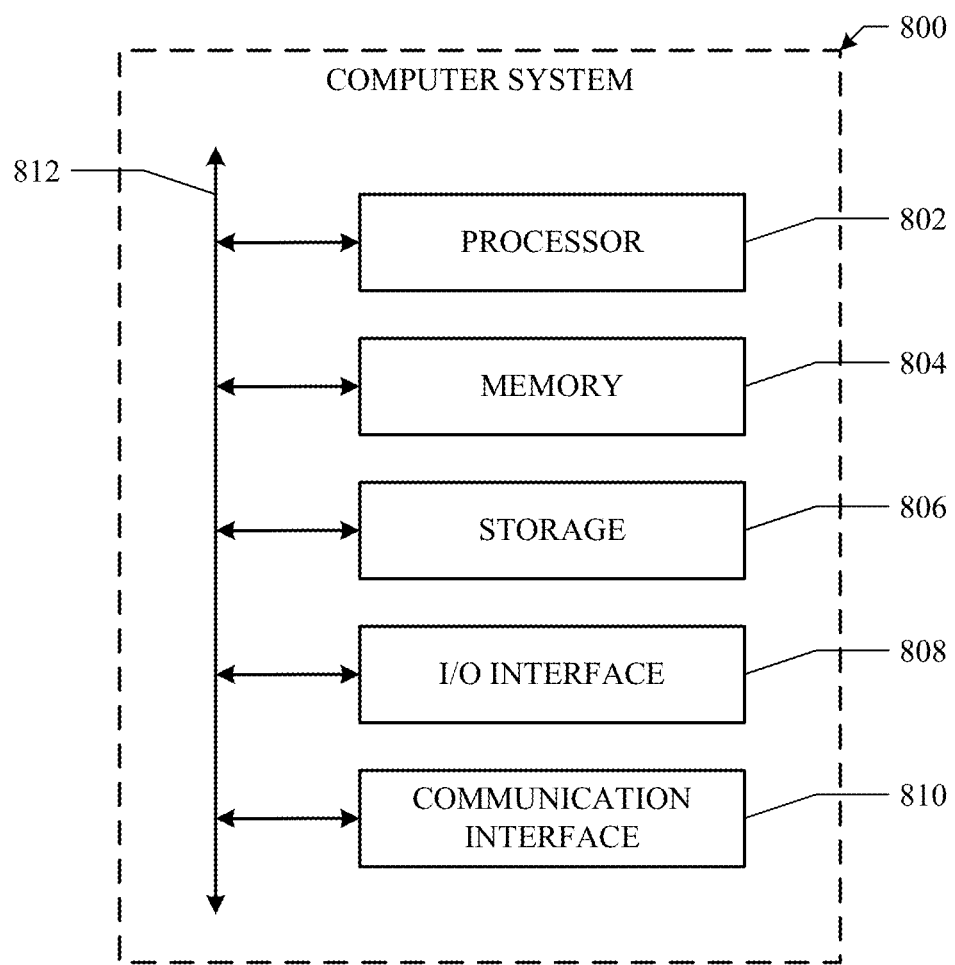
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them.

During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   capturing an image using a camera, wherein the image is associated with a user viewpoint;
   identifying a vertical surface in the image using a machine learning model, wherein one or more properties associated with the vertical surface meet one or more criteria for rendering a three-dimensional virtual space corresponding to a virtual store;
   determining relative positions and orientations of one or more three-dimensional display elements to the vertical surface, wherein the one or more three-dimensional display elements are positioned behind the vertical surface;
   determining the three-dimensional virtual space based at least on the one or more properties of the vertical surface, the user viewpoint, and the relative positions and orientations of the three-dimensional display elements to the vertical surface, wherein the three-dimensional virtual space comprises the one or more three-dimensional display elements, and wherein the three-dimensional virtual space appears behind the vertical surface as seen from the user viewpoint;
   rendering the three-dimensional virtual space for the vertical surface; and
   displaying the three-dimensional virtual space, wherein the displayed three-dimensional virtual space, as seen from the user viewpoint, is visible within an area on the vertical surface and appears to replace contents within the area on the vertical surface.

2. The method of claim 1, wherein the three-dimensional virtual space is rendered using one or more internal virtual light sources.

3. The method of claim 1, wherein the associated properties of the vertical surface comprise one or more of:
   a location;
   a size;
   a texture;
   a material type;
   a shape;
   a flatness metric;
   a lighting condition;
   a direction;
   a relative position to an object;
   an angle in a three-dimensional space;
   an associated object;
   an associated person;
   an associated place;
   a blank space; or
   a display content.

4. The method of claim 1, wherein the one or more criteria are based on one or more thresholds for the one or more associated properties of the vertical surface.

5. The method of claim 1, wherein the one or more three-dimensional display elements are related to one or more products associated with the virtual store.

6. The method of claim 1, wherein the three-dimensional virtual space further comprises one or more two-dimensional display elements.

7. The method of claim 1, wherein the three-dimensional virtual space comprises one or more of:
   a model;
   a product;
   a brand name;
   a text description;
   a logo;
   an illustration;
   an artistical content;
   a dynamical visual effect;
   an interactive icon; or
   a multi-media content.

8. The method of claim 1, further comprising:
   determining a user information associated with a user; and
   determining the three-dimensional virtual space based on the user information associated with the user.

9. The method of claim 8, wherein the user information associated with the user comprises one or more of:
   a social network profile;
   a search history;
   a browsing history;
   a purchase history;
   an interest;
   a preference;
   a user setting;
   an emotion state;
   a behavioral state of the user;
   a time related to the behavioral state of the user;
   an interaction of the user with an object;
   an indication of the user;
   a user input;
   a gesture; or
   a command.

10. The method of claim 1, wherein the vertical surface has one or more first display contents that are not overwritten by augmented reality contents, and wherein the method further comprises:
rendering one or more second display contents on the vertical surface in addition to the one or more first display contents of the vertical surface.

11. The method of claim 1, further comprising:
measuring a status of a user when the user is near the three-dimensional virtual space rendered on the vertical surface; and
calculating one or more impression metrics based on the measured status of the user.

12. The method of claim 11, wherein the status of the user comprises one or more of:
an emotion state;
a behavioral state of the user;
a time related to the behavioral state of the user;
an interaction of the user with an object;
an indication from the user;
a user input;
a setting choice of the user;
a gesture;
a vergence distance; or
a command.

13. The method of claim 11, wherein the impression metrics comprise one or more of:
a time;
a location;
a gazing duration;
a gazing direction;
a gazing sequence;
an attention metric for an element;
a time interval since last impression; or
a reaction metric of the user.

14. The method of claim 11, further comprising:
tracking an activity of a user after the user has an impression of the three-dimensional virtual space; and
determining a correlation between the activity of the user and the impression of the user on the three-dimensional virtual space.

15. The method of claim 1, further comprising:
receiving from a user an interaction with the three-dimensional virtual space; and
adding an item related to the three-dimensional virtual space to a list based on the received interaction of the user.

16. The method of claim 15, wherein the interaction comprises one or more of:
a selection on an interactive icon;
a gesture;
a voice command;
a vergence movement; or
a user input.

17. The method of claim 1, wherein a bottom edge of the display area has a distance to a ground surface, wherein the distance is greater than a threshold distance for preventing a viewer from trying to walk into the three-dimensional virtual space.

18. The method of claim 1, wherein the three-dimensional virtual space comprises one or more virtual walls, wherein the one or more three-dimensional display elements cast shadows on the one or more virtual walls of the three-dimensional virtual space, and wherein shapes of the casted shadows of the one or more three-dimensional display elements are dependent on relative positions of the one or more virtual walls in the three-dimensional virtual space.

19. One or more non-transitory computer-readable storage media embodying software that is operable when executed by a computing system to:
capture an image using a camera, wherein the image is associated with a user viewpoint;
identify a vertical surface in the image using a machine learning model, wherein one or more properties associated with the vertical surface meet one or more criteria for rendering a three-dimensional virtual space corresponding to a virtual store;
determine relative positions and orientations of one or more three-dimensional display elements to the vertical surface, wherein the one or more three-dimensional display elements are positioned behind the vertical surface;
determine the three-dimensional virtual space based at least on the one or more properties of the vertical surface, the user viewpoint, and the relative positions and orientations of the three-dimensional display elements to the vertical surface, wherein the three-dimensional virtual space comprises the one or more three-dimensional display elements, and wherein the three-dimensional virtual space appears behind the vertical surface as seen from the user viewpoint;
render the three-dimensional virtual space for the vertical surface; and
display the three-dimensional virtual space, wherein the displayed three-dimensional virtual space, as seen from the user viewpoint, is visible within an area on the vertical surface and appears to replace contents within the area on the vertical surface.

20. A system comprising:
one or more non-transitory computer-readable storage media embodying instructions;
one or more processors coupled to the storage media and operable to execute the instructions to:
capture an image using a camera, wherein the image is associated with a user viewpoint;
identify a vertical surface in the image using a machine learning model, wherein one or more properties associated with the vertical surface meet one or more criteria for rendering a three-dimensional virtual space corresponding to a virtual store;
determine relative positions and orientations of one or more three-dimensional display elements to the vertical surface, wherein the one or more three-dimensional display elements are positioned behind the vertical surface;
determine the three-dimensional virtual space based at least on the one or more properties of the vertical surface, the user viewpoint, and the relative positions and orientations of the three-dimensional display elements to the vertical surface, wherein the three-dimensional virtual space comprises the one or more three-dimensional display elements, and wherein the three-dimensional virtual space appears behind the vertical surface as seen from the user viewpoint;
render the three-dimensional virtual space for the vertical surface; and
display the three-dimensional virtual space, wherein the displayed three-dimensional virtual space, as seen from the user viewpoint, is visible within an area on the vertical surface and appears to replace contents within the area on the vertical surface.

* * * * *